May 29, 1956 P. S. DICKEY 2,747,595
FLUID PRESSURE SELECTOR STATION FOR CONTROL SYSTEMS
Filed May 9, 1952 4 Sheets-Sheet 1

| SELECTOR POSITION | VALVE POSITIONS | | | | |
|---|---|---|---|---|---|
| | 5 | 4 | 3 | 2 | 1 |
| HAND | OPEN | CLOSED | OPEN | OPEN | CLOSED |
| AUTO | CLOSED | OPEN | CLOSED | CLOSED | OPEN |

INVENTOR.
PAUL S. DICKEY
BY Raymond D. Junkins
ATTORNEY

May 29, 1956 P. S. DICKEY 2,747,595
FLUID PRESSURE SELECTOR STATION FOR CONTROL SYSTEMS
Filed May 9, 1952 4 Sheets-Sheet 4

INVENTOR.
PAUL S. DICKEY
BY
Raymond W. Jenkins
ATTORNEY

United States Patent Office 2,747,595
Patented May 29, 1956

2,747,595

FLUID PRESSURE SELECTOR STATION FOR CONTROL SYSTEMS

Paul S. Dickey, East Cleveland, Ohio, assignor to Bailey Meter Company, a corporation of Delaware Application May 9, 1952, Serial No. 287,074

2 Claims. (Cl. 137—82)

My invention relates to control systems operable automatically or manually to maintain substantially constant any desired electrical, thermal, chemical, physical or other variable condition through the control of a corrective agent or agents. More particularly, my invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value or manually for varying the condition as desired. The supply of the agent may be controlled by a device which is operated by fluid delivered at a pressure regulated by the system. When the system is switched from automatic to hand control, or vice versa, the pressure supplied to the device immediately after the switch-over should be the same as the pressure supplied before the switch-over was made, otherwise an operation of the device may be obtained to vary the agent so as to upset the whole system. It is therefore desirable that means be provided for regulating the pressure that will be supplied as well as for indicating the various pressures involved. The indication of the various pressures should be at the control station where the automatic-manual switch is made and they should be in such interrelation that desirable comparisons may be made between the incoming pressure and the outgoing pressure as well as intermediate transfer values, and the like.

In systems of this type it is usual to provide a measuring controller for the variable to be controlled, a manual-automatic selector station, and a regulating device (such as a valve) for the agent. These three basic devices may be physically located adjacent one another or may be widely separated; due to conditions encountered or the desire of the purchaser.

In many instances the physical location of the measuring point may be far removed from the location of the control valve; and both, a considerable distance from availability to the operator who should be able to observe the value of the variable, the effect of the regulation, as well as to have available the possibility of removing the system from "automatic" and placing it on "manual" control.

Fluid pressure telemetering is known wherein a fluid pressure is developed continuously bearing a relation to the value of the variable or to the extent and direction of departure of the value from desired standard or set point. Such a measuring-controller is a transmitter which may be indicating and recording and may preferably be located adjacent the desirable point of measurement of the variable for many reasons. The fluid loading pressure is transmitted to the control valve for positioning the same and the transmitter and valve may be widely separated. Intermediate the two is a manual-automatic selector station which may be conveniently located upon a control panel, with other measuring and controlling instrumentalities at a central location, under observation of an operator.

In such a system it is usual to provide the measuring-controller (transmitter) with proportional band or sensitivity adjustability, as well as with set point or standard setting adjustability. But, if the transmitter is located far from the operator he is unable to observe, or change, these adjustments.

A principal object of my present invention is to provide a fluid pressure system of the type described with proportional band and set point adjustment possibilities remote from the transmitter and even remote from each other if desired; preferably the two adjustments may be convenient to the operator.

Furthermore, the operator should have before him a continuous indication or record of the actual value of the variable as well as of the remotely chosen set point value to observe the effectiveness of the regulation at all times. It is therefore a further object of my invention to provide apparatus of this nature.

Another object of the invention is to provide an improved manual-automatic selector station incorporating remote set point adjustability and indication, as well as various pressure indications of the system in readily comparable relation.

Still another object is to provide an improved ratio relay, receptive of the remotely established set point and having improved proportional band or sensitivity adjustabilities.

An object of my invention is to provide an improved system for controlling a condition. Another object is to provide a system that may be adjusted for operation either automatically or manually to control the condition. Still another object is to provide an improved system in which a valving mechanism is selectively operative for supplying fluid pressure from automatic or manual control means to a regulating device, and separate gages are provided for indicating the various fluid pressures.

A further object is to provide, in connection with an improved selector station for selectively effecting either manual or automatic control, a grouping of gages indicating the various fluid pressures for visual guidance at transition in order to reduce the magnitude of any pressure differential which otherwise might be detrimental.

Other objects will appear in the course of the following description.

In the drawings:

Fig. 1 diagrammatically illustrates a fluid pressure measuring and controlling system embodying the invention.

Fig. 2 is a tabulation of valve positions in connection with Fig. 1.

Fig. 3 diagrammatically illustrates a further embodiment of my invention.

Figures 1, 2:
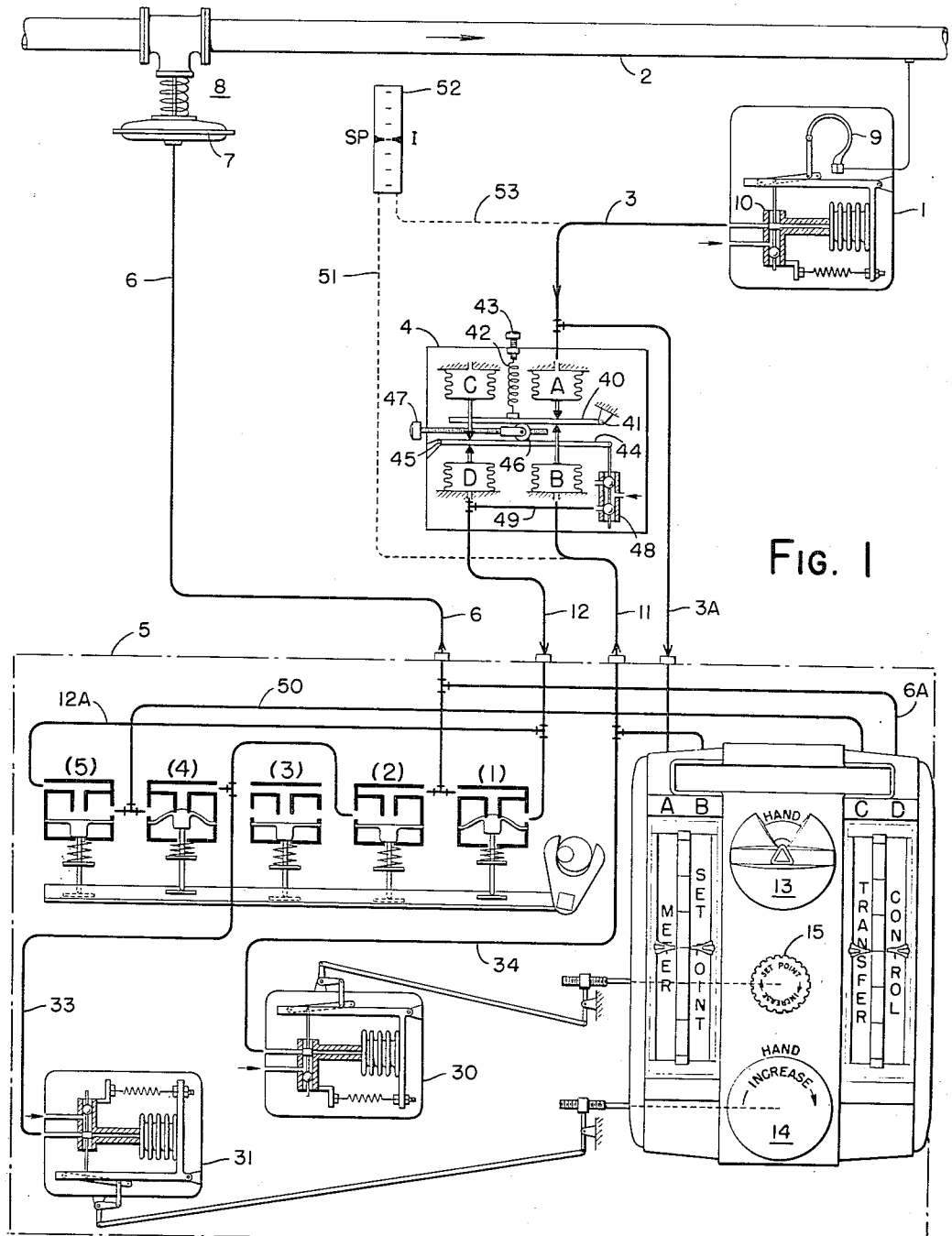

Referring now to Fig. 1, I show therein, quite diagrammatically, a simple fluid pressure control system in which a measuring-controlling transmitter 1 is continuously sensitive to the value of a variable such as fluid pressure within the conduit 2 and continuously establishes in a pipe 3 a pneumatic fluid pressure within the range 0–30 p. s. i. proportionately representative of some range of values of the variable. Such a range may be a range from zero to maximum expected value or a suppressed range within the confines of such extremes.

The pipe 3 joins a pneumatic relay 4 and a manual-automatic selector station 5. The pipe 6 communicates between the selector station 5 and the diaphragm 7 of a valve 8 controlling the variable (fluid pressure within the conduit 2).

Due to the limitation in space of the present drawing sheet, and the desire to have the components 1, 4 and 5 shown to as large a scale as possible, it is not feasible to accentuate the possibility of distance between the elements 1, 4, 5 and 8. It will, however, be appreciated that, in view of my present invention, the transmitter 1 is preferably located immediately adjacent the desired point of pressure measurement for the conduit 2 to minimize measuring piping, lag in measurement, etc. The location of the valve 8 is fixed by design of the plant and may be at a considerable distance from the measuring point 1. Preferably, the relay 4 and the selector station 5 are located relatively close to each other and at a central panel board under the observation of an operator. It is therefore apparent that the elements 1, 4, 5 and 8 may be any or all in juxtaposition or may be all widely separated from each other. Through the agency of my present invention it is possible to locate these various elements as desired and still retain the desired interrelation in operation with most efficient observation and adjustability by the operator.

As previously mentioned, it is known to usually provide the measuring-controlling transmitter 1 with set point and proportional band adjustments; but they may then be completely inaccessible to the operator. I thus provide that these adjustabilities be available in the devices 4 and/or 5 as will be pointed out hereinafter. By removing set point and proportional band adjustments from the transmitter 1 I preferably use therein a pressure establishing mechanism of the type illustrated and claimed in the copending application of Harvard H. Gorrie S. N. 169,751, having the same assignee as the present inventor and now Patent 2,675,015. Pressure within the conduit 2 is available within a Bourdon tube 9 effective in controlling a pilot 10 to establish in the pipe 3 a pneumatic loading pressure having a range of 5-25 p. s. i. for the selected range in the controlled pressure of conduit 2. In other words, the 5-25 p. s. i. range of air pressure within the pipe 3 may represent 0-200, 0-1000, 200-300, or other selected range of pressure within the conduit 2 and under adjustability of the mechanism within the transmitter 1 in known manner.

I have indicated that the pipe 3 is branched as at 3A to enter the selector station 5. Additionally the selector 5 is joined by pipes 11, 12 and 6, all having arrows indicating the direction of application of the fluid pressures therein. For instance the pipes 3A and 12 transmit pneumatic pressures to the device 5 while pipes 6 and 11 transmit pneumatic pressures from the device 5. It will be seen that, in general, the measurement pressure in pipe 3A enters the device 5 while the control pressure in pipe 6 passes from the device 5 to actuate or position the valve 8.

Figures 5, 6:
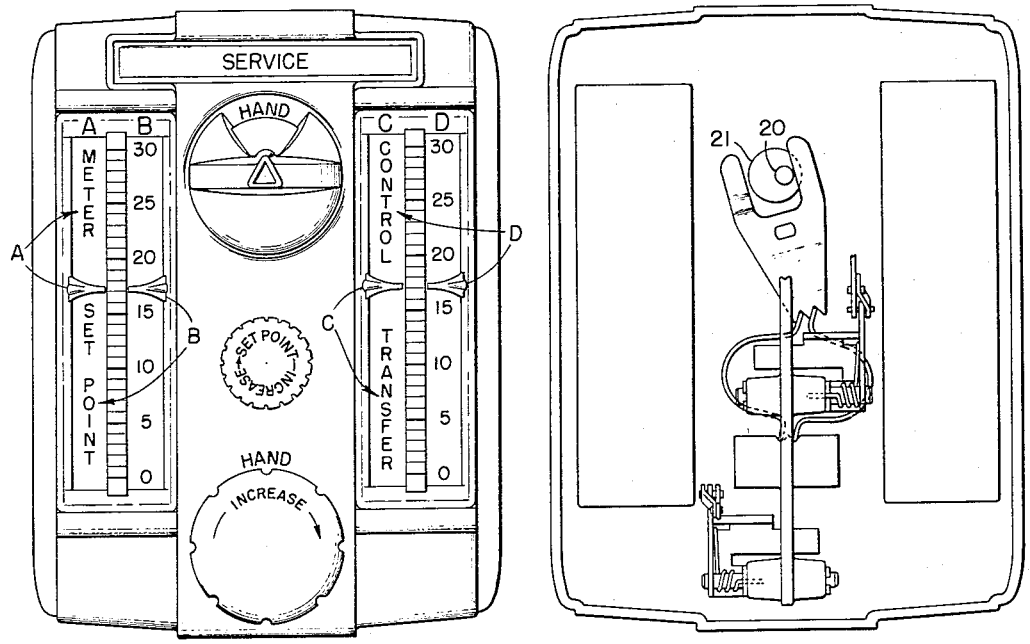
Fig. 5 is a front view of the face of a selector station.
Fig. 6 is a rear view of the front portion of the selector station taken along the line 6—6 of Fig. 4, in the direction of the arrows.

The device 5 provides selective possibilities and when the selector knob 13 is in "automatic" position, then the loading pressure in pipe 3, acting through the selector 5 and in conjunction with the relay 4, is passed to the pipe 6 for impression upon the diaphragm 7 and regulation of the valve 8. When it is desired to place the control of the valve 8 under "hand" domination from the location 5, it is possible to turn the knob 13 to its "hand" position and thereafter control the pressure in the pipe 6 by means of a hand control knob 14. Under either "hand" or "automatic" operation the value of the control pressure in pipe 6 is shown by pointer D along the graduation 0-30 p. s. i. (see Fig. 5).

Pressure within the pipe 3, indicative of the actual measured value of the variable in pipe 2, is continuously shown by pointer A along a graduation (0-30 in Fig. 5) which may be in terms of the actual pressure range of the measuring device 1 if desired. Two other pointers B and C are shown and their use will be mentioned hereinafter. The pointers for indicating the various fluid pressures A, B, C and D may be actuated by Bourdon tubes sensitive to the fluid pressures, and the mechanisms may be like those of the copending application of T. A. Green et al. S. N. 176,382, having the same assignee as the present inventor, filed July 28, 1950.

Before proceeding to describe the actual mechanism, and its operation, of the selector station 5, I would point out that the knob 13, on the face of the station 5, allows selectivity between "hand" and "automatic" control of the valve 8. Under "hand" selectivity the knob 14 allows an increase or decrease in control pressure within the pipe 6. A third knob 15 is provided through whose agency is established a fluid loading pressure representative of desired set point and which leaves the device 5 through a pipe 11 to enter the relay 4. This pressure value is shown by the position of pointer B in interrelation to the actual metered value representation of pointer A. In other words, if the value of the variable within the conduit 2 is as desired, namely, the same as the set point value, then the pointers A and B will indicate the same value on the common scale or index therebetween.

Figures 7, 8, 9:
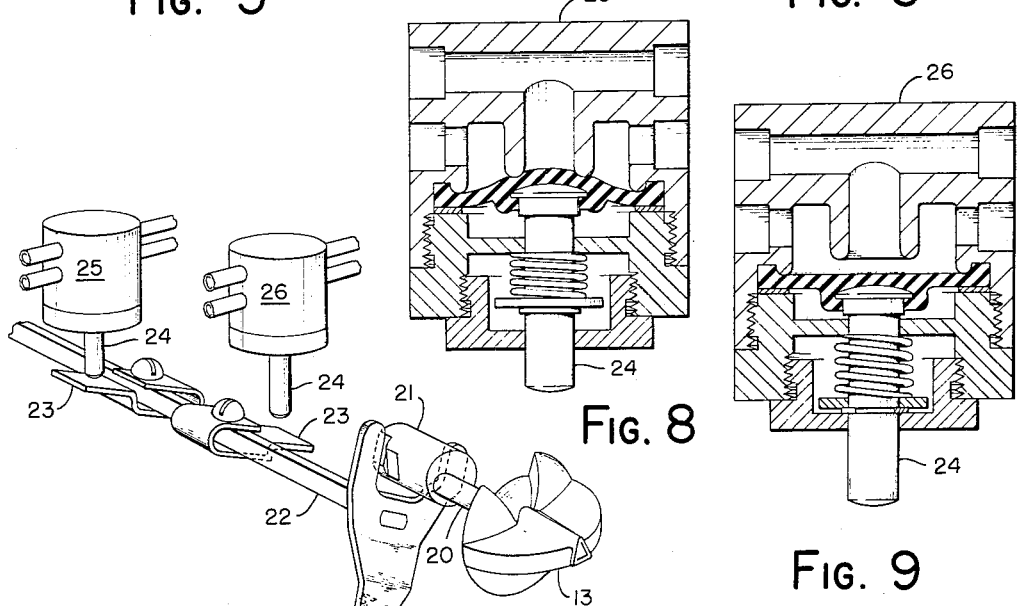
Fig. 7 is an isometric view of a portion of Fig. 4.
Figs. 8 and 9 are sectional views of one of the shut-off valves of Fig. 4 in closed and open positions.

Actuation of the selector knob 13 manually between the "hand" and "automatic" positions thereof effectively opens or closes fluid pressure valves and the valves, along with the mechanism for positioning them, will now be explained in connection with Figs. 4, 5, 6, 7, 8 and 9. The desired operation is to actuate the fluid pressure valves definitely to an open or a closed position without allowing the mechanism to come to rest at any intermediate position. Thus, certain toggle-like or notching mechanism is provided for insuring a positive positioning of the movable portions of the valves from one extreme to another representative of "hand" and "automatic" position. Fig. 7 shows the assembly in a somewhat diagrammatic and isometric view wherein the knob 13 has a shaft 20 carrying an eccentric 21 for rocking the square shaft 22 to one position or the other. The shaft 22 may carry a plurality of valve operating plates 23 engageable with the movable valve stems 24.

One plate 23 is shown in engagement with the valve stem 24 of the valve 25 thus providing the valve 25 in closed position (Fig. 8). The plate 23 for valve 26 is not in engagement with its valve push rod 24 and Fig. 9 shows that valve 26 is in open position. In Fig. 1 the valves numbered (1) and (4) are shown in closed position corresponding to valve 25 of Fig. 8; while the valves (2), (3) and (5) are shown in open position corresponding to valve 26 of Fig. 9.

The operating mechanism, and details of the valves per se, are described and claimed in the copending application of Paul S. Dickey et al. S. N. 251,406 having the same assignee as the present inventor, filed October 15, 1951, now Patent 2,729,222, and it does not appear necessary to go into any further detail herein. It suffices to say, referring to Fig. 1, that movement of the knob 13, in either direction 180° will position the valves (1), (2), (3), (4) and (5) between the shown position (Fig. 1 for "hand") and the alternate position for "automatic" in accordance with the tabulation of valve positions of Fig. 2.

The knobs 14 and 15 each position the pilot of a fluid pressure establishing device similar to that of transmitter 1, described in detail in the previously mentioned Gorrie copending application. In Fig. 1 I show these devices 30, 31 quite diagrammatically connected to be positioned by knobs 15 and 14 respectively; while in Fig. 4 it will be appreciated that the devices 30 and 31 lie substantially back to back, supported by a central plate 32. The operation of the devices 30 and 31 is identical in that each, upon mechanical positioning through the agency of its respective knob, establishes an output pneumatic loading pressure substantially linear, within a range 5–25 p. s. i., with positioning of the respective knob.

Thus, movement of the knob 14 actuates the device 31 (Fig. 1) to establish in a pipe 33 a fluid loading pressure directly representative of position of the knob 14. In similar manner, movement of the knob 15 actuates the device 30 to establish in a pipe 34 a pneumatic fluid loading pressure representative of position of the knob 15. Pressure within the pipe 34 is continually available to actuate the pointer B. Pressure within the pipe 33 is, under "hand" operation, indicated by the pointer D while under "automatic" operation it is indicated by the pointer C.

The pneumatic relay 4 is of the adjustable ratio type of force-balance relay. Four expansible contractible chambers, designated A, B, C and D, take the form of metallic bellows although they might equally as well be diaphragms or other well known constructions which change the position of a movable wall thereof when subjected to varying pressure; in the present instance internally. In Fig. 1, chamber C is an idle chamber, open to the atmosphere. Chambers A and B act to exert opposing forces upon a beam 40 which is pivoted at 41. The beam 40 is further loaded by a spring 42 having an adjustment 43. A generally parallel beam 44 is pivoted at 45 and is acted upon by opposing chambers C and D. The beams 40, 44 are spaced by a roller 46 which may be moved lengthwise of the beams 40, 44, relative to their pivots 41, 45, through the agency of an adjusting screw 47.

Carried by the free end of the beam 44 is the movable element of a pilot valve 48, supplied from a source of compressed air at about 28 p. s. i., and continuously establishing in the pipe 49 a fluid loading pressure representative of balance, or unbalance, of the force-balancing system. The pipe 49 joins the D chamber as well as an output pipe 12 previously mentioned. Thus the pressure developed by the pilot 48, available in the D chamber, provides a balance-back force for the force-balance system.

The remote set point loading pressure effective within the B chamber of relay 4 is that which is established by device 30 through manual positioning of knob 15 and is representative of the desired set point, or operating level, or standard setting to which the control system is to regulate. By way of example, assume that the expected range of pressure within conduit 2 is 0–1000 p. s. i. and the desired standard to be maintained is 500 p. s. i. The range of pressure established by transmitter 1, in pipe 3, is 5–25 p. s. i. and the set point pressure is 15 p. s. i. effective within chamber A of relay 4 and indicated by pointer A on the selector station 5. The B chamber provides a fixed opposing force for the A chamber and, when the system is in balance, should equal, or be directly proportional to, the loading of chamber A.

Disregarding the spring 42 and the chamber D, the force-balance system comprising the chambers A, B and the beam 40 may be considered to be in balance. If the roller 46 is mid-way the pivots 41, 45 then the movable element of the pilot 48 will be in such a position that a predetermined control pressure will exist in the pipe 49 and chamber D and this predetermined balance control pressure is offset by adjustment of the spring 42 through the agency of adjustment 43. The entire system is then in balance.

Assuming a constant pressure within the chamber B, representative of remote set point loading, any additional adjustment of the spring 42 will bias the remote set point loading as will be apparent. Thus the relay 4 contains two set point adjustments, namely a remote loading pressure effective within chamber B and a local hand adjustment 43.

With the selector knob 13 in "hand" position as shown in Fig. 1, the final control pressure developed by relay 4, balancing-back in chamber D, and available in output pipe 12, is stopped by selector valve (1) and does not reach regulating valve 8. It is however, observable by pointer C of the selector station. The regulating valve 8 is, under this condition, positionable through the agency of knob 14 and device 13.

When the selector knob 13 is turned to "automatic" position the final control pressure of relay 4, available in pipe 12, acts through the now open valve (1) directly through pipe 6 to position the regulating valve 8 and is available through a branch pipe 6A to position the pointer D of the selector station. Any deviation in pressure within the conduit 2 from the pre-established standard setting or set point value, as represented by the loading pressure within chamber B, will result in a movement of beam 40 which, acting through the roller 46 and beam 44 in opposition to the pressure within chamber D and spring 42, will cause a positioning of the movable element of pilot 48 in proper direction to vary the control pressure within pipe 49 and thus within chamber D to oppose such unbalance and restore the system to balance. Such restoration will tend to restore the pilot 48 to its initial balance position and the system will settle out with the pilot 48 displaced from balance position to a degree whereby the opposing pressure within chamber D results in equilibrium of the movable system.

The output pressure, available in chamber D and pipe 12, is effective upon the valve 8 to regulate pressure within the conduit 2 and tend to return the same to the set point value. The over-all operation so far described is, in general, known in the art. It is the particular apparatus which I have described which constitutes the improvements of my invention.

It will be evident that I may vary the control set point or operating level of the system remotely by varying the loading pressure within the chamber B, through movement of the set point adjusting knob 15 located at the selector station 5. Thus, it is unnecessary for the operator to leave the central control panel containing the selector station 5 and go to either the relay 4, or to the measuring-controller transmitter 1, to make any desired variation in set point.

Movement of the roller 46 along the beams 40, 44 provides a proportional band or sensitivity adjustment for the system. Proportional band is defined as the range of values of the controlled variable (in this case pressure within the conduit 2) which corresponds to the full operating range of the final control element (valve 8). This may be commonly expressed in percent of the controller-scale range or in units of the controlled variable.

The change in air pressure in chamber D, for incremental changes in air pressure in chamber A, is determined by the proportional band adjustment 47, 46. That is, the position of roller 46, between pivots 41 and 45, determines the effect that an incremental change in pressure in conduit 2 will have on the position of regulating valve 8. This is the sensitivity of the system.

The "proportional band" is a ratio of the change in loading pressure in the A chamber to the change in the control pressure in the D chamber and output pipe 12. This may be expressed as:

Percent proportional band = 
$$\frac{\text{change in input loading pressure (100)}}{\text{change in output loading pressure}}$$

The adjustability of the relay 4 allows a proportional band availability of about 1% to 200%. This means that a 20 p. s. i. g. (5–25) change in pressure to position valve 8 may be effected by a change in incoming pressure (in pipe 3) of .2 p. s. i. g. at one limit of roller 46 adjustment, or that it could be produced by a 40 p. s. i. g. change in incoming pressure (or for 20 to produce 10) at the other limit of adjustability.

Thus the device 4 is a ratio relay whereby movement of the roller 46 along beams 40, 44 will vary the ratio of pressures between that imposed upon chamber A and that produced in chamber D. The ratio adjustment 47 provides proportional band or sensitivity adjustment remote from the transmiter 1. The relay 4 may usually be located on the rear of the central control panel accessible to the operator. Removal of set point adjustment and proportional band adjustment from the measuring-controller frees the same for producing an air pressure which is a true measure of the variable; allowing any number of indicators 52, or recorders, to be actuated from the pressure in pipe 3, without distortion of the pressure in pipe 3 as would result were these adjustabilities in the device 1.

It will now be evident that I have provided a system wherein the elements 1, 4, 5 and 8 may be widely scattered as to location. The selector station 5, usually observable at a central control location, continuously shows by the pointer A the measured value of the variable, by the pointer B the remotely established set point value of the variable, and by the pointer D the actual control pressure being imposed upon the valve 8 regardless as to whether such control pressure is established manually or automatically. The selector station 5 provides manual means for remotely establishing the set point to which the system operates. The set point loading pressure (which may be indicated in terms of the final controlled variable) may be available at still other locations as is indicated by the dotted pipe line 51 leading to a remote indicator 52 which may also be joined by way of pipe 53 to indicate the actual measured value of the variable. My preferred ratio relay structure 4 is a force-balance device receptive of the pressure within pipe 3 representative of the variable measurement, and also receptive of the remotely established set point pressure. It contains a local manual set point bias or adjustment and a proportional band or sensitivity adjustment varying the ratio relationship between the incoming measured loading pressure and the resultant or relayed outgoing pressure available for positioning the valve 8.

When it is desired to change the regulation of valve 8 from "hand" to "automatic," this may be accomplished by opening selector station valves (1) and (4) while simultaneously closing valves (2) and (5) through manually turning knob 13 180° in either direction to the "automatic" position. However, before making this switch-over, it is advisable to first see that no undesirable jolt of operating pressure would be imposed upon valve 8 when knob 13 is switched, i. e. that the control pressure effective upon valve 8 (indicated by poitner D) is the same that will then be impressed upon pipe 6 from pipe 12 output of the D chamber of relay 4. In other words, that the D value under "hand" is the same as C. If C pressure is more (or less) than D then set point knob 15 should be turned until $C=D$. The switch from "hand" to "automatic" may now be made by knob 13 and pressure in pipe 6 will be unchanged. Then a comparison of the A and B scale readings should be made to see that the desired value of the variable is being maintained and the set point value on B returned to desired value. If more or less than is desired then the set point pressure is slowly removed or advanced, thus slowly moving the control valve 8, until the valve 8 is under complete automatic control of the measuring controller 1 with whatever set point was originally indicated on B.

Before switching from "automatic" to "hand" it is advisable to see that C is not different than D. If there is a difference, then vary C by turning knob 15 until $C=D$ and then switch knob 15 from "automatic" to "hand."

The indicating pointers A, B, C and D provide, in interrelation, a convenient and valuable guide to the operator.

A is always the value of the measured variable.
B is the remote set point.
    A should desirably equal B.

D is always the pressure acting to position the control valve 8 and may be calibrated in terms of control valve position.
C is always the unused or comparison pressure.
    When Selector station is on "hand" C is the pressure in 12 (developed by "auto"); it will fluctuate to show what device 1 is doing. $C=A$
    When Selector station is on "auto" C will remain stationary at the last "hand" output before transfer.

Figure 3:
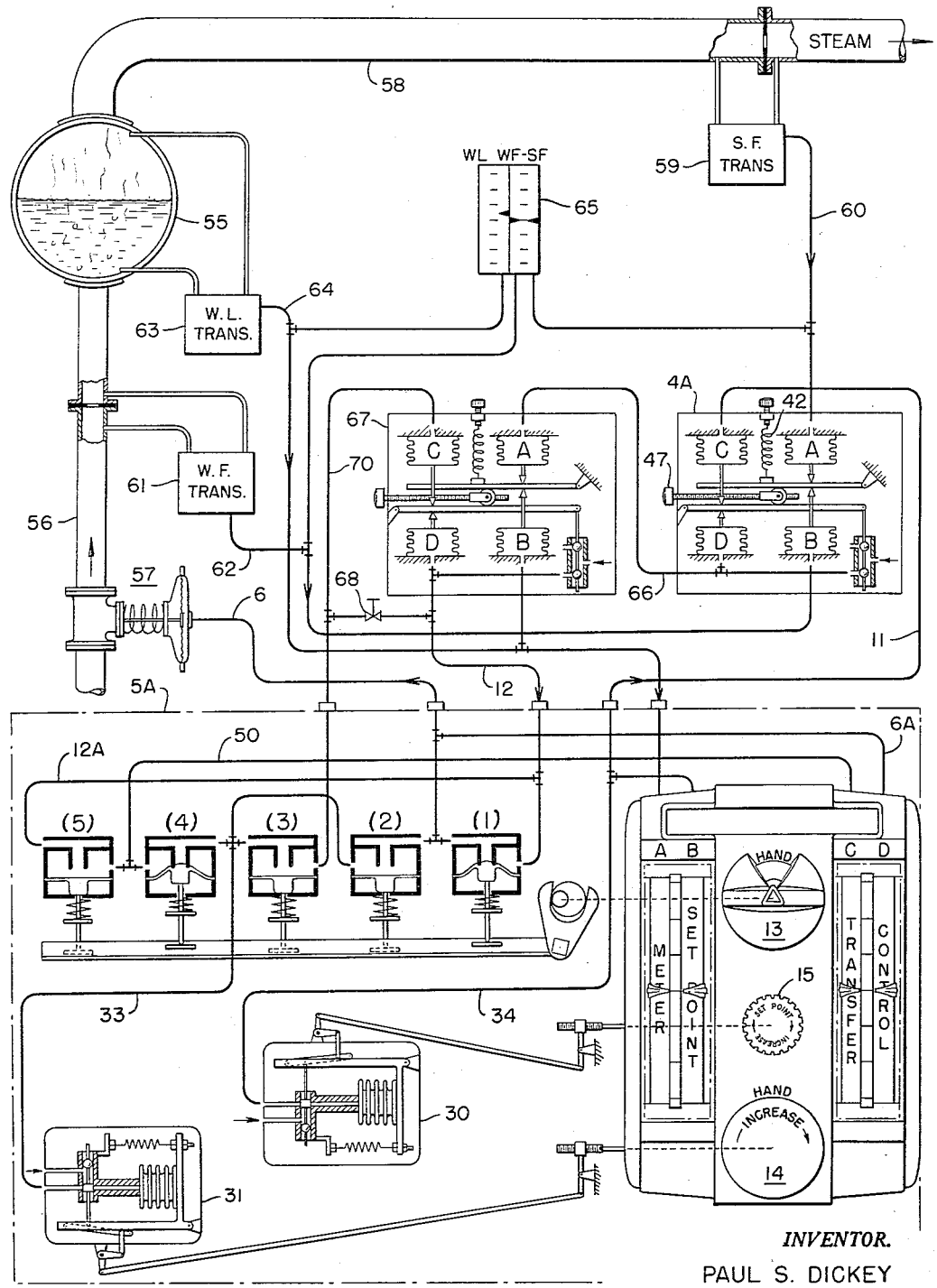
Figure 4:
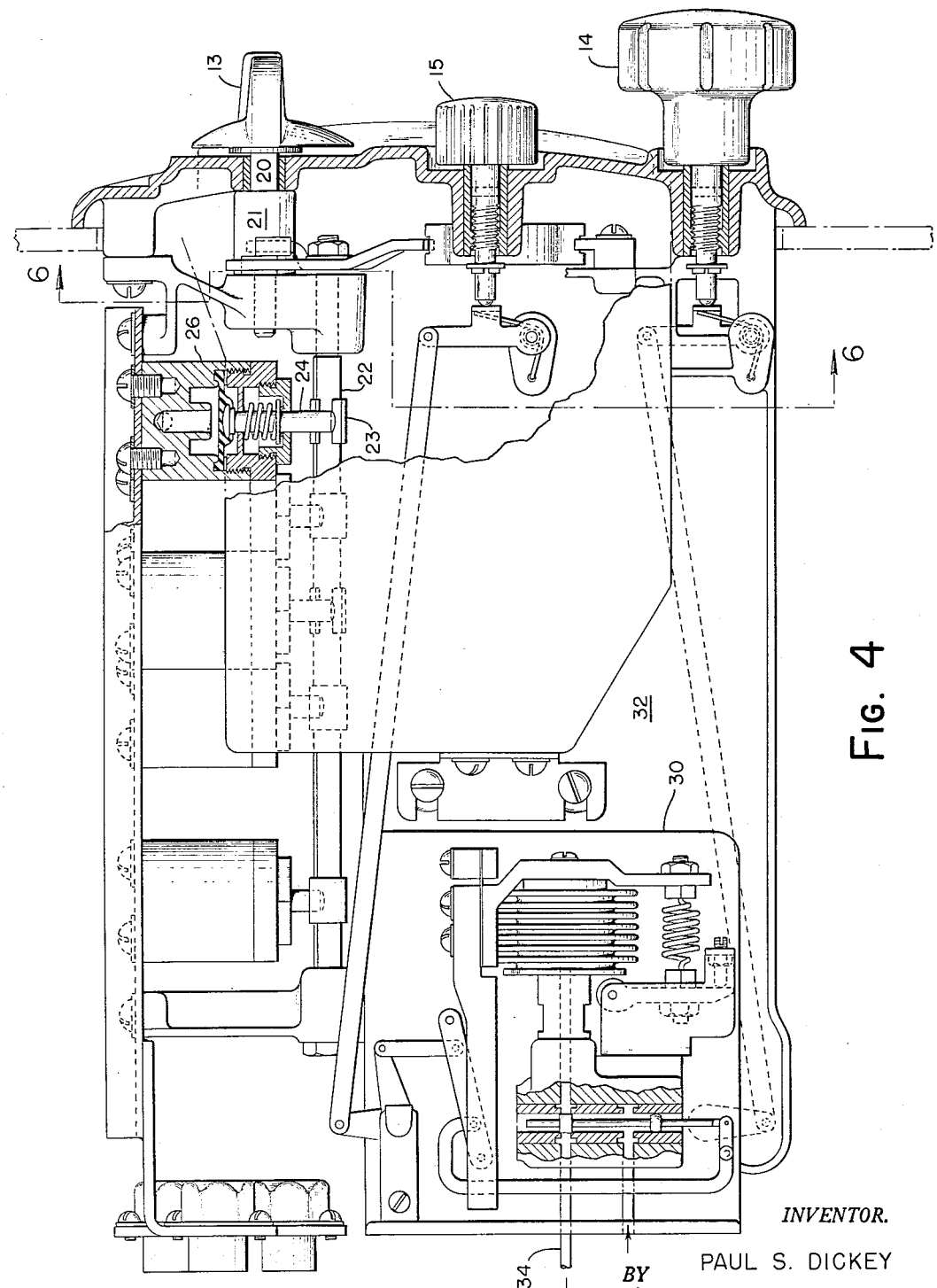
Fig. 4 is a side elevation, partially in section, of a fluid pressure selector station.

In Fig. 3 I have illustrated my invention in an embodiment commonly known as a three-element feed water control system. A vapor generator having a water-steam separation drum 55 is supplied with feed water through a conduit 56 under the control of a regulating valve 57. Steam passes from the drum 55 through an outgoing conduit 58 and the rate of flow of steam is measured by a measuring transmitter 59 which establishes a pneumatic loading pressure within the pipe 60 continuously representative thereof. In similar fashion the measuring transmitter 61 establishes in a pipe 62 a pneumatic loading pressure continuously representative of the rate of supply of feed water through the conduit 56. A measuring transmitter 63 is connected across the elevation of drum 55 and establishes in a pipe 64 a pneumatic loading pressure continuously representative of level of liquid within the drum 55. The measuring transmitters 59, 61 and 63 are similar to the device 1 of Fig. 1 in that each measures a variable and establishes in its output pipe a pneumatic loading pressure in a range 5–25 p. s. i. which is representative of the instantaneous value of the variable being measured. The pipes 60, 62 and 64 are joined to an indicator 65 which may be located at any desired location and continuously indicates the relation between water inflow rate and steam outflow rate and additionally the liquid level within the drum 55.

Desirable control is to maintain liquid level within the drum 55 at or near a preselected level irrespective of rate of operation of the vapor generator. Three-element control which is common in this art acts to interrelate water flow rate, steam flow rate, and liquid level in a system for regulating the inflow rate of feed water. Preferably the inflow rate of water is continuously proportioned to the outflow rate of steam generated. There is then a check-back from actual liquid level within the drum to overcome discrepancies in measurement, characteristics of pumps and the like, which might tend to cause a departure of the level from desired value even though the liquid inflow rate were roughly proportioned to the vapor outflow rate. Thus, the present system primarily compares a fluid pressure representative of water inflow rate with a fluid pressure representative of steam outflow rate by connecting the pipes 64 and 60 respectively to the B and A chambers of a differential ratio relay 4A. The output of the relay 4A, established in the D chamber thereof, and available in a pipe 66, joins the A chamber of a differential ratio standardizing relay 67 of generally similar construction.

After initial adjustment, if the loading pressures within pipes 60 and 62 balance the system of relay 4A, a predetermined output pressure will exist in pipe 66, determined by the adjustment of spring 42 and the value of the remote set point loading pressure effective in chamber C through pipe 11 from the device 30 under control of the manual knob 15.

The differential ratio standardizing relay 67 is similar in construction to the relays 4 and 4A. Pipe 66 is connected to chamber A. Pipe 64 is connected to chamber B and subjects thereupon a fluid loading pressure representative of liquid level within the drum 55. This loading pressure is also continuously available at the A pointer of selector station 5A. Inasmuch as the set point of this system is the desired standard of liquid level within the drum 55, the pressure effective on pointer B represents the desired liquid level while pointer A represents the actual liquid level.

The output of relay 67, comparing pressures between pipes 66 and 64, is available in the balance-back chamber D which is connected to output pipe 12. The C and D chambers are interconnected through a needle valve 68 whose function will now be explained.

The function of the standardizing relay 67 is to reproduce the loading relationship between chambers A and B in the outgoing control pressure pipe 12 and by means of a regenerative action, to amplify the change in outgoing air loading pressure until the incoming effect is returned to a predetermined value. This action gives a proportional plus reset response. A floating control of high sensitivity superimposed upon a positioning control which may be of relatively low sensitivity. The result, in the output pipe 12, is that upon change in the relationship between the A and B chamber pressures, an immediate response in pressure change in pipe 12 in the same direction followed by a continuing regenerative readjustment of such pressure in pipe 12 which may be in the same direction or in the opposite direction until the condition is satisfied.

In the system of Fig. 3 the selector station valve (3) is used in the "hand" position shown; the output pressure of device 31, available in the pipe 33, passing through the valve (3) which joins the C chamber of relay 67. Thus the bleed 68 is effectively over-ruled by imposing upon the C chamber the pressure established manually by the device 31 and which is at the same time effective within the pipe 6 for positioning the valve 57. Under "hand" control the measuring instrumentalities continue to impress their output pressures upon the relays 4A and 67 and the final loading pressure output of the relay 67, available in pipe 12 and in bellows D, would possibly be quite erratic at time of future switch-over from hand to automatic. Thus, during "hand" control the bleed 68 is by-passed by the pipe 70.

While I have chosen to illustrate and describe my invention in certain preferred embodiments, it will be understood that this is by way of example only, and I do not desire to be limited thereby.

What I claim as new, and desire to secure by Letters Patent of the United States, is:

1. A fluid pressure selector station for varying the magnitude of a control fluid pressure and having three manually positionable elements, including in combination a first manually positionable control element having alternate operating positions selectively placing the station under hand domination or automatic domination, a second manually positionable control element operable to vary the magnitude of the control fluid pressure, a third manually positionable control element operable to vary the magnitude of a fluid pressure representative of set point pressure, and an interlocking valve assembly jointly responsive to actuation of the three manually positionable control elements and positioned by the first manually positionable control element in the automatic position thereof to render ineffective the second manually positionable control element and effective the third manually positionable control element, and in the hand position of the first manually positionable control element rendering ineffective the third manually positionable control element and effective the second manually positionable control element.

2. The selector station combination of claim 1 in which the three manually positionable control elements are in spaced vertical alignment and the third manually positionable control element operable to vary the magnitude of a fluid pressure representative of set point pressure is intermediate the other two.

References Cited in the file of this patent

UNITED STATES PATENTS

| | | |
|---|---|---|
| 1,962,676 | Albright | June 12, 1934 |
| 2,073,838 | Hammond et al. | Mar. 16, 1937 |
| 2,098,913 | Dickey | Nov. 9, 1937 |
| 2,202,286 | Gorrie | May 28, 1940 |
| 2,202,485 | Fitch | May 28, 1940 |
| 2,223,356 | Krogh | Dec. 3, 1940 |
| 2,227,258 | Hilmer et al. | Dec. 31, 1940 |
| 2,284,795 | Belaef | June 2, 1942 |
| 2,285,540 | Stein et al. | June 9, 1942 |
| 2,301,301 | Mallory | Nov. 10, 1942 |
| 2,311,853 | Moore | Feb. 23, 1943 |
| 2,313,991 | Fitch | Mar. 16, 1943 |
| 2,369,887 | Eckman | Feb. 20, 1945 |
| 2,427,235 | Snoot | Sept. 9, 1947 |
| 2,476,104 | Mason | July 12, 1949 |
| 2,505,981 | McLeod | May 2, 1950 |
| 2,518,244 | Moore | Aug. 8, 1950 |
| 2,594,136 | DiMaggio | Apr. 22, 1952 |
| 2,637,342 | Shannon | May 5, 1953 |
| 2,701,576 | Higgins | Feb. 8, 1955 |
| 2,706,994 | Moore | Apr. 26, 1955 |

FOREIGN PATENTS

| | | |
|---|---|---|
| 568,634 | Great Britain | Apr. 13, 1945 |